Sept. 1, 1970 R. E. HORTON 3,526,730

TELEPHONE SWITCH BUTTON RETAINING DEVICE

Filed June 7, 1967

INVENTOR
ROY E. HORTON
BY Edward A. Sokolski
ATTORNEY

United States Patent Office 3,526,730
Patented Sept. 1, 1970

3,526,730
TELEPHONE SWITCH BUTTON RETAINING DEVICE

Roy E. Horton, 3097 Bayer St., Marina, Calif. 93933

Filed June 7, 1967, Ser. No. 644,311
Int. Cl. H04m *1/02*
U.S. Cl. 179—189 5 Claims

ABSTRACT OF THE DISCLOSURE

A device for maintaining telephone switch buttons in a depressed inoperative position when the handset is lifted from its cradle, comprising a spring clamp member for disposition across the cradle platform of the phone between the switch buttons, having side extensions with apertures therein for slidably moving over the switch buttons.

Many devices have been described in the prior art for effectively retaining telephone switch buttons that a child cannot accidentally pick up a handset and dial an undesired long distance number or generally play with the phone and disrupt service. Most all the prior devices operate to maintain the switch buttons on the phone in a depressed position when the receiver is lifted so as to prevent the utilization of the phone. However, the prior devices have several drawbacks. Some of them are quite complicated in construction and involve various working parts. Thus they are costly and difficult to maintain, as well as often difficult to operate. Some of the prior devices are undesirable in that they must be manually actuated to press the switch buttons of the phone in the downward and locked position. Thus, if one forgets to take this step the device is obviously ineffectual. In those devices where the switch buttons are automatically locked when the receiver is replaced on its cradle, the devices have the problems aforementioned as to complexity of construction.

The device of this invention overcomes the deficiencies of prior art devices in that it is extremely simple in construction, having no moving parts. It is inexpensive to manufacture and is inconscpicuous when attached to the telephone so as not to affect the overall appearance. Further, the device operates to automatically retain the switch buttons when the handset is replaced in its cradle. The herein device must be manually deactivated in order to utilize the phone.

Briefly, the invention comprises a flexible clamp which is secured to a normal desk telephone, between the cradle platform and the hand carrying recess thereunder. The top surface of the clamp is flat and extends between the switch buttons, having apertures corresponding to the buttons. In its normal non-flexed position, the clamp rests so that the buttons are covered by the solid portion of the top flat surface of the clamp, preventing them from rising to an "on" position. When the handset is lifted from its cradle, the clamp is manually slid forward exposing the apertures to the buttons allowing the buttons to rise to an "on" position. In the "on" position, the clamp is then placed in flexure tending to exert pressure against the buttons in a direction toward the back of the device. When the handset is replaced, the buttons are depressed to the surface of the device and the backward pressure forces the buttons downward and the clamp device slides over the buttons, covering them and thus retaining the switches to an "off" position. It is believed that the device will be better understood from the following detailed description and drawings in which:

Figure 3:
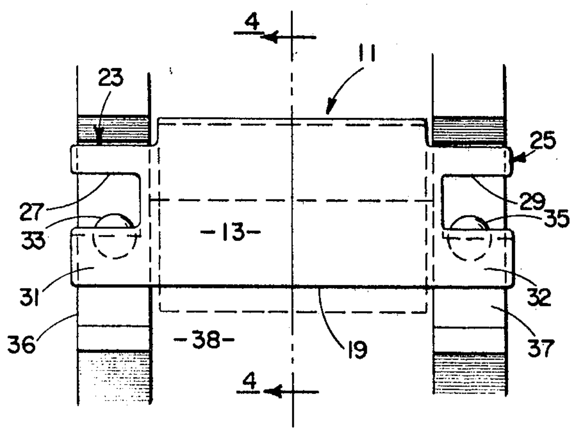
Figure 4:
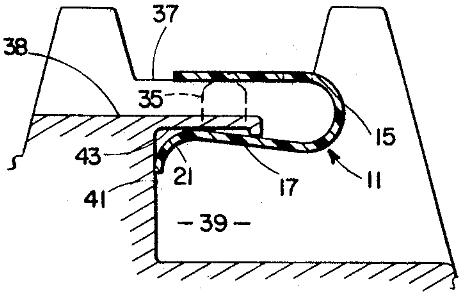
Figure 5:
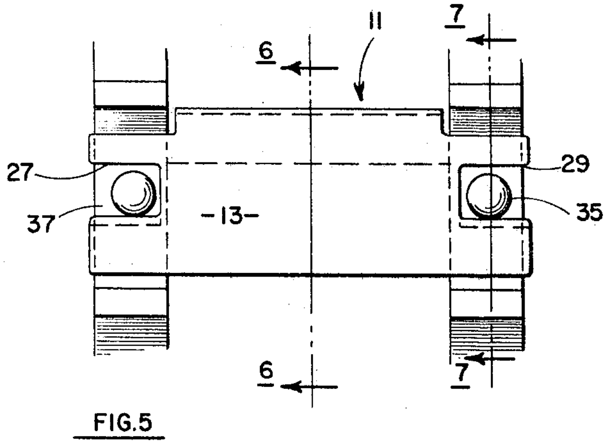
Figure 6:
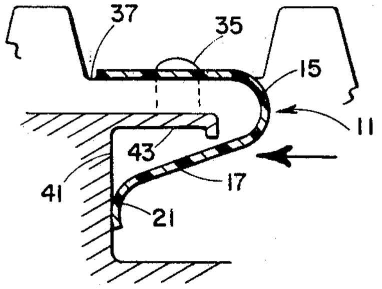
Figure 7:
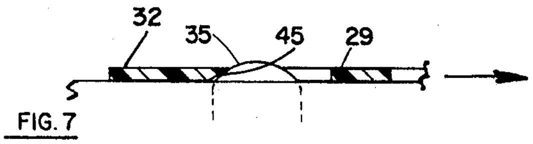

FIG. 3 is a top view of the device of the invention shown in relation to telephone switches, FIG. 4 is a sectional side view taken along lines 4—4 of FIG. 3, FIG. 5 is a top view showing the device of the invention with relation to the telephone switches in a retained position, FIG. 6 is a sectional side view taken along lines 6—6 of FIG. 5, and FIG. 7 is a partially sectioned view disclosing the relationship of the switch button to the device.

Figure 1:
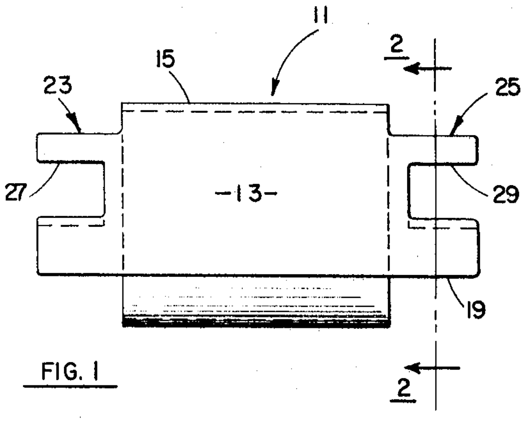
FIG. 1 is a top view of the device of the invention.
Figure 2:
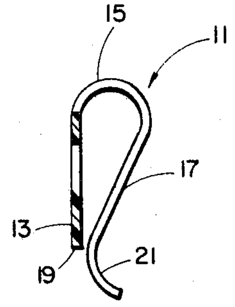
FIG. 2 is a sectional side view of FIG. 1 taken along lines 2—2 thereof.

Referring now to FIGS. 1 and 2, there is shown the device 11 of the invention which comprises a flat top portion 13. The top flat portion 13 is integrally formed with a curved section 15 at the rear thereof. Extending from the curved section 15 is a bottom portion 17 of the lock device which extends angularly upward toward the top surface 13 almost meeting it at the leading edge 19 of the top surface. The bottom portion 17 extends beyond the front edge 19 of the top surface 13 curving at 21 away from the top surface. The width of the bottom portion 17 and the main portion of the body top surface 13 is equivalent to or slightly less than the distance between the raised platforms of the telephone in which the switches are located, as will be explained. Extending from the top surface 13 are tab portions 23 and 25, having apertures 27 and 29 respectively therein. The device is made of a pliable elastic material, such as plastic or even spring steel, such that it is resilient and can give along the curved portion 15 when stress is exterted thereon. Thus it can be seen that the device can be likened to a clip member which is secured between the platform for the switch buttons and the top surface of the hand carrying recess in the rear of the phone beneath the platform.

Turning to FIGS. 3 and 4, the device 11 is shown in the position wherein the switch buttons are locked. This is the normal position for the device when the handset is sitting on the phone. As can be seen, the front tab portions 31 and 32 serve to at least partially cover the switch buttons 33 and 35. The switch resides in elevated handset platforms 36 and 37 which are connected by the flat portion 38 extending therebetween.

As particularly shown in FIGS. 3 and 4, the tab portions 23 and 25 rest on the elevated receiver platform 37 with the curved portion 15 facing toward the rear of the phone curving underneath the platform to the recessed area 39. As can be seen, the leading bottom curved portion 21 rests against the front wall 41 of the recess 39. In the position shown in FIG. 4 the device 11 is secured by the spring action in a clip fashion between the handset platform 37 and the top surface 43 of the recess 39.

With reference now to FIGS. 5 and 6, the device is shown in the unretained position permitting the switch buttons 35 and 37 to rise to an "on" position. This is accomplished by manually sliding the device 11 forward toward the front of the phone in the direction of the arrow in FIG. 6, such that the apertures 27 and 29 are in alignment with the switch buttons permitting them to rise. As can be seen particularly from FIG. 6, the forward movement causes the curved portion 21 to move down the front wall 41 of the recess. Since the device is essentially a spring clip, the tendency of the bottom portion 17 is upward toward the top of the recess 43 when in the position shown in FIG. 6. In other words, the spring has been forced by the forward movement into a position of expansion from its normal position. It then has a tendency to contract to its original shape as shown in FIG. 2. As a result when the handset is placed on its platform 37, the button 35 is depressed to the top surface 25 of the device. As shown in FIG. 7, when this occurs, the front edge of the apertures 27 and 29, which are canted as at 45, moves over the button in a direction shown by the arrow, forcing it downward. In order to facilitate the retraction of the device 11, it is preferred to cant the front edge 45 of the apertures, as described, so that the depression of the button is readily facilitated.

As can thus be seen, the device of this invention is of a simple one-piece construction with no moving parts. The device relies upon the spring action in its forced expansion when it is manually moved forward after the handset is lifted from its platform so as to expose the switch buttons. This expansion of the spring action of the device automatically forces it to retract and cover the switch buttons when the handset is replaced on its platform.

Though one particular embodiment of the invention has been specifically shown, it should be readily apparent that the principle of operation can be applied to slightly different embodiments. For example, the bottom portion 17 need not extend toward the top portion 13 to form a tight clamp therewith. Rather, the two portions can be almost parallel to each other. The important action is caused by the downward movement of the curved section 21 causing expansion of the device. It can be seen that to achieve this effect the section 21 does not have to initially contact the front of the recess in the position shown in FIG. 4 prior to it being manually slid forward. As long as contact is made shortly after the forward movement so as to cause the expansion, the device will successfully operate. The initial contact as shown in FIG. 4 assures the greatest expansion and thus the greatest spring force.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A telephone switch button retaining device for a desk telephone having raised switch button containing portions and a hand carrying recess disposed under said portions, and a handset for resting on said raised portions, said retaining device comprising:

a flat top portion for disposition between said switch button containing portions, side extensions integral with said top portion, said extensions having apertures therein which can be aligned with said switch buttons when said top portion is disposed across said raised portions, a resilient curved portion integral with said top portion for curvature around the switch button containing portion of said telephone from the top thereof to said hand carrying recess, a bottom portion extending from said curved portion for extension into said recess, said bottom portion extending upwardly toward said top portion so as to form a spring clamp therewith, and an extension portion integral with said bottom portion, extending away from said top portion of said device, wherein said extension portion will contact the front of the recess when said device is disposed on the telephone.

2. The device of claim 1 wherein the apertures are non-aligned with said buttons when said handset is resting on said raised portions, said side portions thus operating to depress and lock said switch buttons.

3. The device of claim 1 wherein said extension portion extends from said bottom portion beyond said top portion.

4. The device of claim 1 wherein said extension portion is curved away from said top portion.

5. The device of claim 1 wherein the edges of said apertures which pass over the switch buttons are canted so as to provide easy movement of the lock device when the handset is replaced and the buttons are depressed to the top portion of said device.

References Cited

UNITED STATES PATENTS

| | | | |
|---|---|---|---|
| 3,124,664 | 3/1964 | Beatty | 179—189 |
| 3,069,513 | 12/1962 | Nimer | 179—189 |

KATHLEEN H. CLAFFY, Primary Examiner

T. W. BROWN, Assistant Examiner